Dec. 20, 1955     S. H. MAGID     2,728,072

TACHOMETERS

Filed May 14, 1953

INVENTOR.
SIDNEY H. MAGID
BY Albert Sperry.
ATTORNEY

United States Patent Office 2,728,072
Patented Dec. 20, 1955

2,728,072

TACHOMETERS

Sidney H. Magid, Morrisville, Pa.

Application May 14, 1953, Serial No. 355,025

13 Claims. (Cl. 340—266)

This invention relates to tachometers capable of giving a warning or special indication when a predetermined speed is attained and is directed particularly to constructions which are adjustable at will to alter the speed or other condition to which the indicator will respond.

Tachometers, such as speedometers for example, are generally provided with a needle movable over a dial to give an instantaneous indication of the speed at which a shaft is rotating or a vehicle is travelling. However, instruments of this type do not ordinarily give a special indication or warning when a specific or dangerous condition is being recorded. There have been some instances in which the speedometer is provided with a transparent disc movable with the pointer and colored so that a light showing through the disc changes from green to orange as the speed increases beyond 30 miles per hour and turns red at a speed of 50 miles per hour. However, these limits or indications of change are selected and fixed by the manufacturer of the equipment and cannot be adjusted or varied by the operator.

In accordance with the present invention, means are provided which are adjustable by the operator while the tachometer is in use to cause an electrical system to respond to one or more selected speeds. Thus, in the case of a speedometer, the operator when driving in city traffic may set the device to give a warning indication if the car is travelling faster than 25 miles per hour. However, as the driver proceeds into a rural district he may adjust the indicator to give a warning signal at a speed of 50 or 55 miles per hour, or if the car is driven on a high speed turnpike the instrument may be adjusted to give a warning indication at 60 or 70 miles per hour, as desired. Similar adjustments may be made to maximum and minimum speeds or other desired conditions.

One of the objects of the present invention is to provide a tachometer with an indicating device capable of being adjusted to respond to one or more selected speeds.

Another object of the invention is to provide an indicating device which may be adjusted or varied at will and while the device is in operation to respond to different conditions of operation.

A specific object of the invention is to provide a speedometer with means which are adjustable at any time by the operator to give a warning indication to any selected speed of travel and capable of maintaining such indication continuously as long as the speedometer registers any speed in excess of that for which the device is adjusted.

These and other objects and features of the present invention will appear from the following description thereof in which reference is made to the accompanying figures of the drawing.

Figure 2:
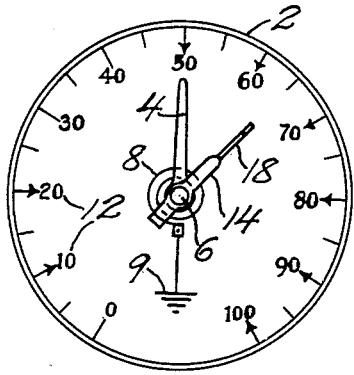
Fig. 2 is a front view of the assembly illustrated in Fig. 1.
Figure 1:
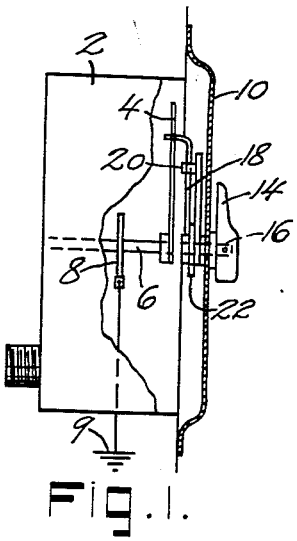
Fig. 1 is a vertical sectional view through a typical tachometer assembly embodying the present invention.
Figure 3:
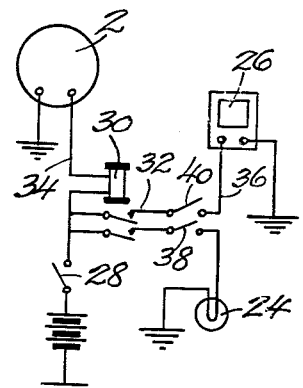
Fig. 3 is a wiring diagram showing a typical circuit arrangement with which the assembly of Figs. 1 and 2 may be used.

In that form of the invention chosen for purposes of illustration in Figs. 1 to 3, the tachometer 2 is in the form of a speedometer which may be of any conventional type such as a centrifugal speedometer having an indicating needle 4 mounted on a shaft 6 and biased toward a zero position by a hair spring 8. The speedometer needle is metallic and serves as an electrical contact element which preferably is grounded at 9 in any suitable way as by connection to the speedometer case through the hair spring 8 or otherwise. A cover plate 10 overlies the speedometer needle 4 and if desired may conceal the usual dial of the speedometer completely, as shown in Fig. 2. The cover plate, when opaque, is graduated as shown at 12 to correspond to the various speed indications on the speedometer dial, whereas such graduations are unnecessary when the cover plate is transparent since the markings on the speedometer dial will then be visible through the cover plate.

An adjustable pointer 14 is mounted on a shaft 16 passing through the cover plate 10 in axial alignment with the shaft 6 by which the speedometer needle is carried. The pointer 14 is suitably formed to be grasped by the fingers and turned to any desired graduation or position corresponding to the speed at which it is desired to have an indication or warning signal actuated. A contact member 18 is rotatably mounted on shaft 16 adjacent the inner face of the cover plate 10 and in position to be engaged by the speedometer needle 4 as it moves in response to the speed of travel of the motor vehicle. Contact member 18 is biased thereby means of a light hair spring 22 toward a stop member 20 fixed to shaft 6. The stop member is circumferentially aligned with the adjustable pointer 14 so that rotation of the pointer to any desired graduation on cover plate 10 will cause the contact element 18 to take up a corresponding position in the path of movement of the speedometer needle 4. However, the contact element 18 is free to rotate away from the stop member 20 and against the biasing action of its hair spring 22 upon movement of the speedometer needle 4 into contact therewith. Thereafter, the contact element 18 will travel with and maintain electrical contact with the speedometer needle as long as the speedometer is registering a speed in excess of that to which the adjustable pointer 14 has been turned. However, when the speedometer needle swings back below the speed to which the adjustable pointer has been set, the contact element 18 will engage the stop member 20 and be held against further retrograde movement so that the contact between the speedometer needle 4 and contact element 18 will be broken when the speed falls below that for which the device is adjusted.

The adjustable pointer 14 may be moved from one position to another at any time and while the speedometer is in operation so that the operator can select and vary the speed at which an electrical signalling circuit will be completed and the conditions under which it will be maintained.

The electrical circuit controlled by the contact between speedometer needle 4 and contact element 18 may include various signalling or control elements of a visible, audible, governor or other type. As shown in Fig. 3, a typical circuit may include a signal lamp 24 located on the vehicle dashboard or elsewhere and a buzzer 26 positioned at a suitable point to give a signal which will be audible to the driver of the vehicle. A switch 28 may be included in the circuit to render the device operative or inoperative as desired. Further, as indicated in Fig. 3, the circuit may include a relay 30 and contact 32 dividing the system into an actuating circuit 34 and a signalling circuit 36 carrying different voltage. Switches 38 and 40 may also be provided to permit either the lamp 24 or the buzzer 26 to be eliminated without breaking the other circuit.

In using the electrical system of Fig. 3, the contact element 18 is set at whatever speed the operator may elect, say 30 miles an hour. The switch 28 and one or both of the switches 38 and 40 are closed and thereafter as long as the vehicle is operating at a speed below 30 miles an hour, the system will remain idle. However, when the vehicle speeds up, the speedometer needle will move over into engagement with the contact element 18 completing a circuit through the control circuit 34 and relay 30. The relay will thus be energized to close the contact 32 in the signalling circuit whereupon the lamp 24 will be lighted and buzzer 26 will be actuated to warn the operator that the vehicle is being operated at excessive speed. As long as vehicle continues to travel at a speed in excess of 30 miles per hour, and even though it travels at a much higher speed, the contact between the speedometer needle and contact element 18 will be maintained and the warning signal will persist. However, when the vehicle slows down to a speed below 30 miles per hour, the contact member 18 will engage and be held in place by the stop member 20 while the speedometer needle moves on below the 30 mile indication and the actuating circuit will be broken to de-energize relay 24 and break the signalling circuit 36. The light will then go out and the buzzer will be silenced until the circuits are again actuated by an increase of speed to exceed that for which the adjustable pointer has been set.

Figure 4:
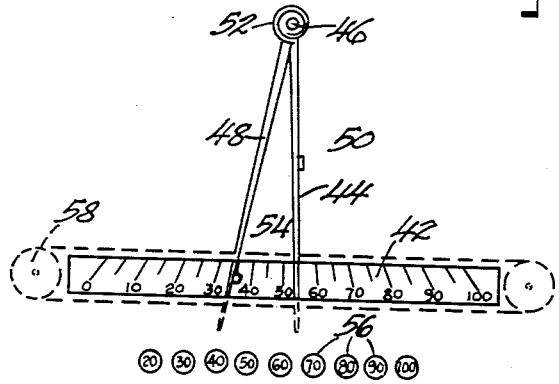
Fig. 4 is a front elevation of an alternative assembly which may be used in the practice of the present invention.
Figure 5:
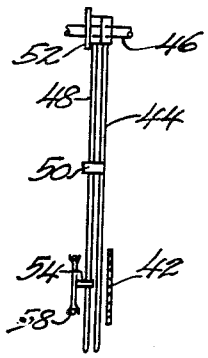
Fig. 5 is a view in cross section illustrating a detail of the construction shown in Fig. 4.

In the alternative, and when using either a centrifugal or magnetic type of speedometer, the speedometer needle may carry a separate spring loaded contact element for engagement with a fixed contact element set in adjusted position by the adjustable pointer, as described more fully in connection with Figs. 4 and 5.

In the construction illustrated in the latter figures the tachometer has an elongated or panel type of dial 42 over which a needle 44 is moved about a pivot 46 or otherwise to travel lengthwise of the dial in indicating the speed of a shaft, vehicle or other member. A contact element 48 is mounted on the needle 44 but is movable relative thereto about a pivot concentric with the needle pivot 46. The contact element 48 is urged toward a stop member 50 on the needle 44 by means of a light hair spring 52 so that the contact member normally travels with the needle but may be retarded by an adjustable contact element 54 while the tachometer needle moves on past the adjustable contact element.

The position of the adjustable contact element 54 may be varied lengthwise of the panel dial 42 by any suitable means, but, as shown, a series of push buttons 56 bearing selected speed notations are arranged to move the contact element from one position to another through conventional operating mechanism indicated at 58, such as that employed in tuning a radio. The light, buzzer or any other visible, audible or electrically actuated signal or control device may be operated upon closing of the biased contact on the tachometer needle and the adjustable contact element 54. Similarly, the circuit of Fig. 3 or any other preferred type of signalling or control circuit may be used to influence or energize control or compensating mechanism in response to the adjusted conditions established by operation of the push buttons or other means for varying the position of contact element 54.

Figures 6, 7:
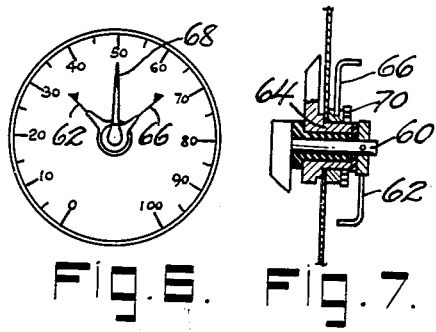
Fig. 6 is a front view of another alternative form of device embodying the present invention.
Fig. 7 is an enlarged view in section showing a detail of the construction illustrated in Fig. 6.

The present invention further may be employed to establish limits between which operation of a tachometer or speedometer will function or provide desired indications or warnings. Thus, as shown in Fig. 6, an adjusting shaft 60 fixedly carries a low limit contact element 62 while a concentric tubular shaft 64 that is insulated from shaft 60 is provided with a spring loaded upper limit contact 66. The needle 68 of the tachometer is movable between the low and high limit elements 62 and 66. With this construction, the contact element 62 will positively limit movement of the needle toward its zero position while the upper limit contact member 66 is biased toward an upper limit stop by hair spring 70. When the tachometer is idle or needle 68 tends to assume a position below that to which the low limit contact element is adjusted the needle 68 will remain in contact with the contact 62. Thereafter, when the needle has moved into the desired zone between the minimum and maximum as established by adjustment of the shafts 60 and 64, the needle will engage neither contact. However, as the needle continues to advance it will engage the upper limit contact element 66 and move it against the action of its hair spring 70 to maintain contact with element 66 as long as an excessive speed is continued.

The circuits including the contact elements 62 and 66 may actuate any desired signal, control mechanism, governors or selsyn motors to give a warning or to compensate or vary the operation of equipment to which the tachometer is connected. In this way, the operation can be controlled within limits that may be varied by the operator through simple adjustment of the shafts 60 and 64 to alter the position of the contacts 62 and 66.

Figures 8, 9:
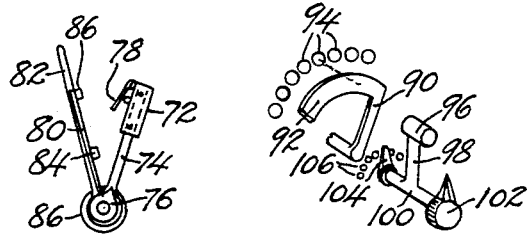
Fig. 8 illustrates a detail of a further modification of the invention.
Fig. 9 is a diagrammatic illustration showing another form of the present invention.

Instead of including the tachometer needle directly in the control or other electrical circuit of the system, the needle may actuate other contact operating means. As shown in Fig. 8, a sensitive switch device such as the micro-switch 72 may be moved to a selected position by an adjusting arm 74 to which the adjusting knob 76 is secured. A pivoted lever 78 on the switch is engageable by an actuating arm 80 movable with the tachometer needle 82. The actuating arm is spring loaded toward a stop 84 on the needle to allow continued movement of the tachometer needle after engagement of the head 86 of the actuating arm with switch lever 78, whereby the switch will remain closed as long as excess speed is maintained. The loading of actuating arm 80 may be effected by the spring member 86 and should, of course, be sufficient to move the switch lever 78 against the forces normally holding the contacts of the micro-switch separated.

As further shown diagrammatically the tachometer needle 90 may carry a shutter element or other extension 92 arranged to pass in front of a series of electric lamps 94 to cut off the flow of light from a selected lamp to a photoelectric cell 96. The cell 96 is carried by an arm 98 secured to shaft 100 and movable to an adjusted position by the pointer carrying knob 102. Shaft 100 also may have a wiping contact 104 thereon engageable successively with stationary contacts 106, each of which is connected with one of the lights 94.

With this construction the knob 102 and shaft 100 are turned to a selected speed indication whereby wiping contact 104 will be moved to engage the stationary contact connected to a selected lamp 94—say the lamp identified with 50 miles per hour. The light from that lamp will fall on the photoelectric cell 96 until interrupted by movement of the needle 90 and extension 92 to cut the beam of light. The photoelectric cell and the circuit in which it is included will then respond to the broken beam of light to give the desired warning or actuate control means for the system to which the tachometer is connected.

Of course, the tachometer needle may consist of a disc with an opening therein corresponding to the extension 92, if desired, in which case the light beam will be broken until an excess speed is attained. Further the extension 92 and photoelectric cell may be replaced by the elements of an electrical condenser or inductive system to control an electrical circuit without establishing physical contact between the tachometer needle and the electrical elements of the adjustable members of the device.

Although the devices described are of particular application to tachometers such as the speedometers of motor vehicles, it will be evident that they have many other applications and uses. Moreover, the particular form and relation of the elements employed in any particular application of the invention are capable of wide variation in construction and combination. In view thereof it should be understood that the particular embodiments of the invention shown in the drawing and described above are intended to be illustrative only and are not intended to limit the scope of the invention.

I claim:

1. A tachometer system comprising a tachometer having a needle movable in a predetermined path in response to the speed of a device to which the tachometer is connected, an element located adjacent the path of movement of said needle, means for adjusting the position of said element to correspond to a selected speed, an electrical circuit including said element and responsive to movement of said needle to and beyond the adjusted position of said element, and means for maintaining said element in contact with said needle for all positions beyond said adjusted position and for discontinuing contact between said element and said needle when said needle returns within the desired limits.

2. A tachometer system comprising a tachometer having a needle movable in a predetermined path in response to the speed of a device to which the tachometer is connected, an element located adjacent the path of movement of said needle, means for adjusting the position of said element to correspond to a selected speed, an electrical circuit including said element, and cooperating means connected to said needle and element movable to establish and maintain said circuit when said needle moves to and beyond the adjusted position of said element, and to break said circuit when said needle returns within the desired range.

3. In combination with a meter having a movable needle, an electrical circuit including a signal means, and means for actuating said circuit upon movement of said needle to a predetermined position, said means including an adjusting device, an element movable by the adjusting device to said predetermined position, and circuit control means connected to said needle and element and operable to actuate said circuit when said needle moves to or beyond said predetermined position and to deactivate said circuit when said needle returns within the desired limits.

4. In combination with a meter having a movable needle, an electrical circuit including a signal means, and means for actuating said circuit upon movement of said needle to and beyond a predetermined position, said means including an adjusting device, an element movable by the adjusting device to said predetermined position, and means for establishing and maintaining contact between said element and needle when the needle moves to and beyond said predetermined position to actuate said circuit and for discontinuing contact between said element and said needle to break said circuit when the needle returns within the desired limits.

5. In combination with a tachometer having a movable needle, an electrical contact element located in the path of movement of said needle, means for adjusting the position of said element to effect initial engagement of said needle with said element when the needle is recording a predetermined speed, a yielding connection between said element and adjusting means for maintaining engagement between the needle and element when the needle moves beyond said position of initial engagement and for discontinuing said engagement when said needle returns within the desired limits, and an electrical circuit including said contact element and actuated during engagement of the needle therewith.

6. A tachometer system including a tachometer having a movable needle, an electrical contact element located in the path of movement of said needle, means for adjusting the position of said element to effect initial engagement of said needle with said element when the needle is recording a predetermined speed, a yielding connection between said element and adjusting means for maintaining engagement between the needle and element when the needle moves beyond said position of initial engagement and for discontinuing said engagement when said needle returns within the desired limits, an electrical circuit including said contact element, and means actuated by said circuit when said needle and said element are in engagement for giving a visible warning that the tachometer is recording a speed equal to or exceeding said predetermined speed.

7. A tachometer system including a tachometer having a movable needle, an electrical contact element located in the path of movement of said needle, means for adjusting the position of said element to effect initial engagement of said needle with said element when the needle is recording a predetermined speed, a yielding connection between said element and adjusting means for maintaining engagement between the needle and element when the needle moves beyond said position of initial engagement and for discontinuing said engagement when said needle returns within the desired limits, an electrical circuit including said contact element, and means actuated by said circuit when said needle and said element are in engagement for giving an audible warning that the tachometer is recording a speed equal to or exceeding said predetermined speed.

8. A speedometer having a pivotally mounted needle movable over a dial, a cover for said dial having a shaft extending therethrough and positioned coaxial with the pivot for said needle, means connected to said shaft for turning it to a selected position corresponding to a predetermined speed, a contact element movable on said shaft and positioned to be engaged by the speedometer needle, stop means movable with said shaft, a spring urging said contact element toward said stop means for initially locating said element in the predetermined position to which said shaft is turned but permitting movement of said element with said needle away from said stop means and beyond said predetermined position, and an electrical circuit including said contact element and actuated by engagement of the speedometer needle therewith.

9. A meter comprising a needle movable over a dial, two spaced contact elements located on opposite sides of the needle in the path of movement thereof for establishing low and high limits of desired operation, means for independently moving said contact elements to selected positions, means for maintaining engagement between the needle and one of said contact elements upon movement of said needle beyond the point of initial contact therewith and for discontinuing said engagement when said needle returns to a position between said selected positions of the contacts, an electrical circuit including said contact elements and actuated by engagement of said needle with either contact element.

10. A meter comprising a needle movable over a dial, two spaced contact elements located on opposite sides of the needle in the path of movement thereof for establishing low and high limits of desired operation, means for independently moving said contact elements to selected positions, an electrical circuit including said contact elements and actuated by engagement of said needle with either contact element, at least one of said contact elements being spring urged toward its adjusted position but movable with said needle beyond said position.

11. A meter system comprising a meter having a member movable in a predetermined path in response to a condition of operation of a device to which the meter is connected, an element located adjacent the path of movement of said member, means for adjusting the position of said element to correspond to a selected condition of operation, an electrical circuit including said element and responsive to movement of said member to and beyond the adjusted position of said element, and means for maintaining said element and member in circuit controlling relation for all positions of said member beyond said adjusted position and for discontinuing said circuit controlling relation when said member returns to a position within said adjusted posiiton of said element.

12. A meter system comprising a meter having a member movable in a predetermined path for indicating a condition of operation of a device to which the meter is connected, an element located adjacent the path of movement of said member, means for adjusting the position of said element to correspond to a selected condition of operation, an electrical circuit including said element, and cooperating means on said member and element operable to establish and maintain said circuit when said member moves to and beyond the adjusted position of said element, and to break said circuit when said member returns to a position within the adjusted position of said element.

13. A tachometer system comprising a tachometer having an element movable in a predetermined manner in response to the speed of a device to which the tachometer is connected, a second element positioned to cooperate with said movable element upon movement of the latter to a position corresponding to a selected speed, means for moving said second element to predetermine said selected speed, an electrical circuit controlled by said cooperation of said elements and responsive to movement of said movable element to and beyond a position corresponding to said selected speed, said elements being operable to maintain said cooperation and control of said circuit when and only when said movable element is at or beyond a position corresponding to said selected speed.

References Cited in the file of this patent

UNITED STATES PATENTS

| | | |
|---|---|---|
| 754,005 | Olson | Mar. 8, 1904 |
| 2,456,062 | Iwanski | Dec. 14, 1948 |
| 2,470,774 | Haswell, Jr. | May 24, 1949 |
| 2,484,038 | Kirlin | Oct. 11, 1949 |